(12) United States Patent
Döhring et al.

(10) Patent No.: US 9,441,380 B2
(45) Date of Patent: Sep. 13, 2016

(54) IMPACT SOUND INSULATION TWO-LAYER PANEL

(75) Inventors: Dieter Döhring, Lampertswalde (DE); Christian Leopolder, Lampertswalde (DE)

(73) Assignee: Kronoplus Technical AG, Niederteufen (CH)

( * ) Notice: Subject to any disclaimer, the term of this patent is extended or adjusted under 35 U.S.C. 154(b) by 1839 days.

(21) Appl. No.: 11/913,825

(22) PCT Filed: Oct. 27, 2005

(86) PCT No.: PCT/EP2005/055604
§ 371 (c)(1),
(2), (4) Date: Nov. 2, 2009

(87) PCT Pub. No.: WO2006/119807
PCT Pub. Date: Nov. 16, 2006

(65) Prior Publication Data
US 2010/0051380 A1    Mar. 4, 2010

(30) Foreign Application Priority Data
May 7, 2005    (DE) .................. 20 2005 007 293 U

(51) Int. Cl.
| E04F 15/20 | (2006.01) |
| E04F 15/02 | (2006.01) |
| E04B 1/82 | (2006.01) |
| E04B 1/84 | (2006.01) |
| E04B 1/86 | (2006.01) |
| E04B 2/02 | (2006.01) |
| B32B 27/32 | (2006.01) |
| G10K 11/168 | (2006.01) |
| G10K 11/162 | (2006.01) |
| D04H 13/00 | (2006.01) |
| E04F 15/18 | (2006.01) |
| E04F 15/04 | (2006.01) |

(52) U.S. Cl.
CPC .............. *E04F 15/20* (2013.01); *B32B 27/32* (2013.01); *D04H 13/00* (2013.01); *E04B 1/82* (2013.01); *E04B 1/84* (2013.01); *E04B 1/86* (2013.01); *E04B 2/02* (2013.01); *E04F 15/02* (2013.01); *E04F 15/181* (2013.01); *G10K 11/162* (2013.01); *G10K 11/168* (2013.01); *E04B 2001/8461* (2013.01); *E04F 15/04* (2013.01); *E04F 2290/043* (2013.01); *Y10T 29/49629* (2015.01)

(58) Field of Classification Search
CPC .............. E04B 1/82; E04B 1/84; E04B 1/86; E04B 2/02; E04B 2001/8461; G10K 11/168; G10K 11/162
USPC .............. 181/290, 294; 29/897.32; 428/172
See application file for complete search history.

(56) References Cited

U.S. PATENT DOCUMENTS

| 3,042,563 | A | * | 7/1962 | Shearer | B32B 27/00 156/182 |
| 3,503,831 | A | * | 3/1970 | Kanematsu | A47B 96/206 106/284.4 |
| 3,658,633 | A | * | 4/1972 | Jumentier | C04B 26/02 156/62.4 |
| 3,729,368 | A | * | 4/1973 | Deith et al. | B27D 1/00 156/209 |
| 3,988,187 | A | * | 10/1976 | Witt | E04F 15/02 156/267 |
| 4,865,912 | A | * | 9/1989 | Mitsumata | B27D 1/00 156/244.22 |
| 5,496,648 | A | * | 3/1996 | Held | B32B 23/04 428/292.4 |
| 5,543,193 | A | * | 8/1996 | Tesch | E04F 15/02 156/297 |
| 5,827,788 | A | * | 10/1998 | Miyakoshi | B44C 5/0407 428/542.2 |
| 5,919,575 | A | * | 7/1999 | Bowns, IV | A47B 96/206 156/228 |
| 6,030,477 | A | * | 2/2000 | Olvey | B29D 24/005 156/210 |
| 6,505,452 | B1 | * | 1/2003 | Hannig | B27F 1/04 52/582.1 |
| 6,572,723 | B1 | * | 6/2003 | Tilton | B29C 43/203 156/219 |
| 6,588,172 | B2 | * | 7/2003 | Porter | B32B 5/18 52/309.15 |
| 6,599,621 | B2 | * | 7/2003 | Porter | B32B 5/18 428/107 |
| 6,773,799 | B1 | * | 8/2004 | Persson | B27N 3/26 156/244.11 |
| 6,818,286 | B2 | * | 11/2004 | Dohring | B32B 27/06 428/213 |
| 7,378,044 | B1 | * | 5/2008 | Hejna | B27N 3/04 156/252 |
| 7,524,550 | B2 | * | 4/2009 | Dohring | B32B 29/06 428/195.1 |
| 7,524,555 | B2 | * | 4/2009 | Peng | B32B 7/12 428/294.7 |

(Continued)

FOREIGN PATENT DOCUMENTS

| DE | 3835638 | 4/1990 |
| DE | 43 29 766 | 3/1995 |
| DE | 196 20 987 | 11/1997 |

(Continued)

OTHER PUBLICATIONS

International Search Report for corresponding application No. PCT/EP2005/055604 dated Dec. 23, 2005 (previously submitted on Nov. 7, 2007).

(Continued)

*Primary Examiner* — David Warren
*Assistant Examiner* — Christina Schreiber
(74) *Attorney, Agent, or Firm* — Renner, Otto, Boisselle & Sklar, LLP

(57) ABSTRACT

The invention relates to floor covering comprising two different impact sound attenuating layers 5, 6.

16 Claims, 1 Drawing Sheet

(56) References Cited

U.S. PATENT DOCUMENTS

| | | | | |
|---|---|---|---|---|
| 7,597,947 | B2* | 10/2009 | Schuster | B27D 1/00 428/528 |
| 7,732,057 | B2* | 6/2010 | Stokes | B32B 21/06 428/220 |
| 2002/0092252 | A1* | 7/2002 | Kettler | B32B 27/20 52/403.1 |
| 2003/0024637 | A1* | 2/2003 | Min | B32B 27/10 156/307.3 |
| 2004/0255538 | A1* | 12/2004 | Ruhdorfer | B32B 27/10 52/506.01 |
| 2005/0263345 | A1* | 12/2005 | Erickson | G10K 11/168 181/290 |
| 2008/0050562 | A1* | 2/2008 | Braun | B32B 3/30 428/172 |
| 2009/0107059 | A1* | 4/2009 | Kipp | C04B 28/26 52/144 |
| 2010/0009115 | A1* | 1/2010 | Ruhdorfer | B32B 3/02 428/99 |

FOREIGN PATENT DOCUMENTS

| | | | |
|---|---|---|---|
| DE | 20109321 | 10/2002 | |
| DE | 20207218 | 9/2003 | |
| RU | 2224070 | 2/2004 | |
| WO | 93/24295 | 12/1993 | |
| WO | 01/09461 | 2/2001 | |
| WO | 02/055811 | 7/2002 | |
| WO | 02/100638 | 12/2002 | |
| WO | 03/035396 | 5/2003 | |
| WO | 03/087498 | 10/2003 | |
| WO | WO03087498 A1 * | 10/2003 | E04F 15/04 |

OTHER PUBLICATIONS

English translation of the International Preliminary Report on Patentability for PCT/EP2005/055604.

* cited by examiner

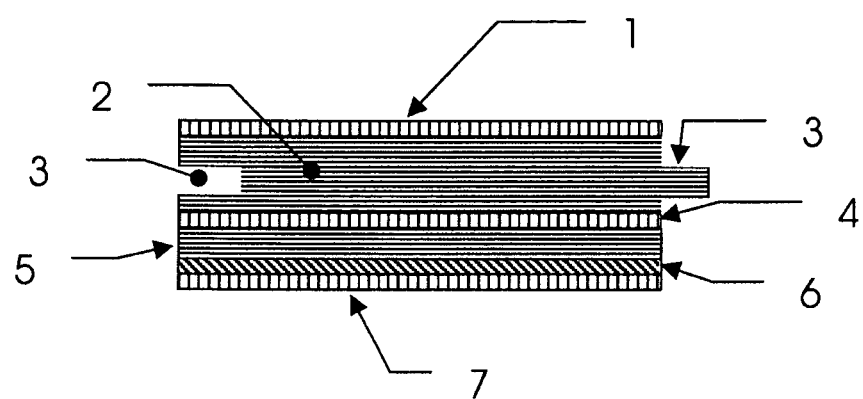

IMPACT SOUND INSULATION TWO-LAYER PANEL

The invention relates to a panel and in particular to rigid panels having a layer for the absorption of footstep sound respectively the improvement of footstep sound for a floor covering as widely used in houses and apartments and to a process for the production of such a panel. A floor covering build from rigid panels having a sound absorption layer is known from document WO 01/09461 A1.

BACKGROUND OF THE INVENTION

A rigid floor covering can consist of wood, timber based materials and/or plastics. Among other things, laminate floors are known which are composed of individual panels and are laid as a floating floor. A single panel consists for example of an HDF-support sheet and a laminated layer applied thereon, which is responsible for the appearance of the floor among other things. In the case of parquet panels the décor is build by a layer of wood. Above the decor usually a transparent protective layer is provided. Underneath a supporting plate usually a further layer is provided, which provides a counter-act. In case of a laminate layer the counter acting or balancing layer is usually formed of a paper. In the case of the parquet panel it is usually a layer of wood.

If people move about in the room a noise is created, which is called footstep sound. The footstep sound is clearly greater in the case of a floor covering build from rigid floor panels as it is the case with rooms, which are provided with carpets or elastic floor coverings such as PVC. The noise development, i.e. the footstep sound, is based on reflection of shock waves introduced into the floor when it is walked on. The amplitude spectrum of the shock of sound waves depends on the room to floor, floor to substrate boundaries and on the attenuation in the different layers. The noise development is particularly high if a layer of air remains between two layers, i.e. for example between the laminated floor and the screed below it.

In order to reduce the noise development from walking, the footstep sound may be absorbed by converting it into heat and thus reduce respectively absorbing it. Another possibility is to shift the frequencies. Depending on the frequency a noise may be perceived as pleasant or unpleasant. By shifting the frequencies it may be achieved, that the footstep sound is perceived as more pleasant and is thus improved.

To absorb or to improve the footstep sound various mat-like materials, such as closed-cell polyethylene foam, cork, polymer bounded mats of recycled rubber and cork, corrugated card or soft wood fiber fabrics are used as an under layer under a rigid floor covering above the screed, as it is known from WO 01/09461. The sound absorbing effect that can be achieved by this method is, however, unsatisfactory. Attempts have therefore been made to stick the above mat-like materials directly to the back of a rigid floor covering, i.e. on the base of a floor panel, for example. Disadvantageously this involves high technical complexity. The costs are consequently high. Overall, the sound reduction is unsatisfactory in relation to technical complexity.

From the document DE 196 20 987 C1, for example, an insulating film is known, which is equipped with an adhesive strip. It is intended to stick the insulating film onto the bottom of a rigid floor covering so as to reduce noise development when a floor is walked on.

From document DE 43 29 766 A1 it is known to provide a polymer material for the footstep sound insulation of a floor. According to the document DE 38 35 638 A1 an insulating mat of expandable polystyrene is used as an insulation in rigid floor coverings. From the document WO 01/09461 A1 it is known to attach a layer of thermoplastic material fixedly with rigid panels of a floor covering, in order to achieve good absorption properties. The WO 93/24295 discloses the application of layers of plastic material with a thin wood covering, which is elastic and thus not rigid in the sense of the present invention.

In the prior art usually a disadvantageous relatively thick sound absorption layer is required, to achieve the desired effect. However, the installation of thick floor coverings is usually problematic in buildings, since due to doors and floors in adjacent rooms the laminate floor may not be too thick. Otherwise, steps are created to adjacent rooms or a door cannot be opened or closed any longer. Steps are undesirable for optical reasons. Additionally, they are so-called trip hazards. Doors have to be adjusted to the different height of the floor covering.

According to document WO 02/100638 A1 it is suggested to provide next to a very thin layer of thermoplastic material with a marked physical relaxation behaviour at ambient temperature a final paper layer on the bottom side of a panel. This teaching is based on the idea to convert sound inside of the thermoplastic layer into heat and to this aim direct sound by means of a fixed connection between the panel and the thermoplastic layer particularly well into the thermoplastic layer.

SUMMARY OF THE INVENTION

The present invention provides a floor covering having a sound absorption.

A panel for a floor covering according to claim 1 is connected to two layers, which serve for the absorption or improvement of footstep sound. One of these two layers consists preferably of a mat composed of fibers and the other preferably of a thermoplastic material. Thermoplastic material is one that softens and becomes free flowing when a material dependent temperature is exceeded. In this state, material is deformable and can be applied to the bottom of the floor covering respectively to the bottom of the further sound absorbing respectively sound improving layer by spreading or roller application and thus firmly bounded to the floor covering within the meaning of the invention. If the temperature falls below that mentioned above, the thermoplastic material solidifies. In particular, the thermoplastic material is chosen such that it displaces a marked physical relaxation behaviour in the ambient temperature range, i.e. that is particularly well suited to absorb footstep sound at ambient temperature.

Examples of thermoplastic polymers with marked physical relaxation behaviour in the ambient temperature range are polyvinyl propionate or polyvinyl acetate. On the other hand polycarbonate, for example, with its high glass transition temperature is a completely unsuitable material. In terms of metrology, suitable materials display a distinct maximum for example when the torsion modulus is presented as a function of a temperature in the loss modulus tan δ in the ambient temperature range or immediate adjacent temperature ranges. The physical basis, including examples of curves, are contained in polymer physics text books such as for example: Chemie, Physik und Technologie der Kunststoffe, Volume 6, Kunststoffe 1; Struktur und physikalisches Verhalten der Kunststoffe, Chapter 4; K. A. Wolf, Springerverlag 1962.

If the materials displace marked physical relaxation behaviour in the ambient temperature range, particularly good absorption is achieved since kinetic energy is converted to heat particularly well. Examples of materials displaying particularly good relaxation behaviour at ambient temperature are:

Polyvinyl formats, polyvinyl butyrals, polyvinyl ethers, polyisobutenes or co-polymers, such as for example terpolymers of acrylonitrile, butadiene and styrene (ABS), copolymers of vinyl cloride and 2-ethylhexyl acrylate, co-polymers of vinyl acetate and vinyl laurate or polymer blends of these polymers, including with the addition of typical polymer plasticisers.

In one embodiment of the invention the layer of thermoplastic material is positioned underneath further footstep sound absorbing respectively improving layers, and in particular under the mat build of fibers. The object of the invention is achieved in comparison to the prior art particularly well, which was surprising for the skilled person for the following reason: The thermoplastic material transforms sound into heat and thus dampens the footstep sound, as one can derive from the documents WO 01/09461 A1 as well as WO 02/100638 A1. This is in particular true for such thermoplastic materials which display marked relaxation behaviour at ambient temperatures. To achieve that the sound created upon walking on a floor covering is actually absorbed due to a conversion in heat in the thermoplastic layer, the sound has to be directed preferably completely into the layer of thermoplastic material. In order so that the sound is preferably completely directed into the same, the sound should preferably be reflected from boundary faces as little as possible, on its way downward from the surface of the floor covering.

In the above-mentioned embodiment an additional boundary layer is created by providing the further footstep sound absorbing or improving layer, which should have been avoided in the prior art. It is therefore surprising, that despite the additional boundary layer overall a better result can be achieved and in particular in comparison to the examples known from documents WO 01/09461 A1 and WO 02/100 638 A1. This is in particular true in the case of a mat consisting of fibers.

In one embodiment of the invention the panel comprises a supporting board and on the topside a décor is arranged for example in form of a printed paper. The décor may also be provided by means of other materials, as for example wood. Such a panel comprises usually coupling elements on its sides, as for example groove and tongue coupling means. The coupling elements are in particularly formed, such that a panel can be connected to another panel without the application of glue, in particular also parallel to the surface of the floor covering. The panel can also comprise a layer serving as counter act on its underside. This consists in particular of a paper, in case in that the decor was already provided in form of a printed paper. The layer serving as counteract consists in particular of wood, in the case that the decor is provided by means of a layer consisting of wood.

In one embodiment of the invention the two layers which serve for the improvement respectively absorption of the footstep sound are arranged next to the supporting board and in particular on its underside. In this case the same are arranged either directly on the supporting board or on the layer serving as counteract.

However, it is also possible to arrange the two layers, which serve for the improvement respectively the absorption of the footstep sound, for example on the topside of the supporting board. In this case the footstep sound is directly absorbed. The surface of the floor covering, however, is in this case mechanically less resistant.

The layer of thermoplastic material and the further sound absorbing respectively sound improving layer are in one embodiment fixedly connected with the panel, for example by means of gluing. In this way the boundary surfaces are less problematic.

One of the sound absorbing layers comprises in particular wood fibers, wherein the fibers are glued together. This mat build from fibers distinguishes from an HDF or MDF board by means of longer fibers, which entwine respectively entangle each other. The fibers of the mat have in one embodiment a length of up to 15 mm. By means of the entangling a connection is achieved. Therefore, the amount of glue can substantially be decreased in comparison to the amount of glue in an HDF respectively MDF board. In comparison to LDF board the mat according to the invention comprises substantially less bubbles or blisters. In one embodiment of the invention the weight of a mat with a thickness of 2 mm to 2.5 mm in the meaning of the invention is 5 to 10 Kg/m$^2$, as for example 7.5 Kg/m$^2$.

For the manufacturing of fibers for a fiber board, as for example HDF, MDF or LDF, in a first step wood splints are cooked and in the next step the cooked wood splints are grinded. In the manufacturing of the fibers for the inventive mat the wood splints are cooked for a relatively short time and/or are grinded for a relatively short time in comparison to the manufacturing of fibers for an HDF, MDF or LDF board. Thereby coarser and in particular longer fibers are achieved.

In a further embodiment of the invention the mat comprises a smooth and a rough surface. The thermoplastic layer is connected with the smooth side of the mat. The side with the rough surface is attached to the panel. In this way the absorption of sound is further improved.

The mat is preferably produced in a calender press. In this way a smooth and a rough surface in the sense of the above-mentioned embodiment is created.

In a further advantageous embodiment of the invention the thermoplastic material is chosen such that it exhibits adhesive properties. Adhesion is a technical term typical of polymers. Thermoplastic rubbers are one example of a material exhibiting adhesive properties within the meaning of the invention.

If the material is selected such that it exhibits adhesive properties, it sticks desirably to the further layer. The inclusion of air between the further layer and the thermoplastic material is thus avoided. Sound is therefore absorbed in a further improvement manner. The sound absorbing properties in one embodiment are particularly good in the case, when a very strong, thin paper is used, which is arranged underneath the thermoplastic layer. For this reason the paper weight is preferably in the range of only 10 to 50 gr/m$^2$. To achieve a particularly strong paper the same is preferably impregnated with a synthetic resin. The synthetic resin is in particular introduced into the inside of the paper by means of for example pressing. The paper is preferably impregnated with acrylate, which is preferably in the inside of the paper. The paper weight in this case is preferably not more than 30 gr/m$^2$.

A strong, thin further layer, as for example a strong paper with a low weight, is further advantageous, in that the overall thickness of the panel is not significantly increased by this further layer.

BRIEF DESCRIPTION OF THE DRAWINGS

FIG. 1 is a cross-sectional view of a panel according to the invention.

DETAILED DESCRIPTION

In FIG. 1 a particularly preferred structure is shown.

The upper surface of the panel comprises a decor layer made of paper and a transparent, wear-resistant layer 1, which is arranged thereon. This layer 1 is connected to an HDF board 2, which might be 3 to 15 mm thick and which is provided on all four sides with coupling means 3.

The coupling means 3 serve for the connection of panels. The same are in particular provided, such that panels of a covering can be connected with each other without the application of glue.

Underneath the HDF board a paper 4 is arranged, which serves as a counter act against the decor paper 1. Underneath the counteracting paper 4 a mat 5 is arranged, which comprises in comparison to the HDF board longer fibers and a lower amount of glue. This mat does not contain any inclusions of air. Air inclusions are present with a LDF board. The mat is preferably 1 to 4 mm thick and in any case in particular thinner in comparison to the support board 2. Underneath the mat 5 the layer of thermoplastic material 6 is arranged, which is very thin and in particular 0.1 to 1 mm thick. A paper 7 is attached to the bottom side of the layer of thermoplastic material.

For the production first a supporting large board is coated with a decor layer on the one side and a counteract as well as the mat on the other side and in particular usually by means of pressing. Advantageously the layer of thermoplastic material is additionally applied and the same is preferably covered by means of paper. Next the large board is cut, such that a number of smaller boards result, which correspond to the size of the panels. On the sides coupling elements as for example tongue and groove means and further locking elements are milled. If not already done, in the next step a thermoplastic layer is applied, which is preferably covered by means of a paper layer.

By connecting the mat before the coating processes with the large board, a good alignment with the edges of the later panels is ensured. In the area of the coupling elements such an alignment is advantageous, since otherwise the coupling elements could for example upon walking on the floor be pushed accordingly further downwardly, which supports material fatigue. This is in particular true for coupling elements, which allow a connecting of two panels without application of glue. For this reason it is also advantageous to apply the further layers underneath the mat before the cutting operation. Since these two further layers are very thin, even when considered together, the influence to the material fatigue is minimized.

The invention claimed is:

1. A floor covering panel comprising a supporting board and at least two further different layers which achieve an improvement of footstep sound absorption, wherein the first layer is a footstep sound absorption mat built from fibers, and the second layer is a footstep sound absorption layer made of thermoplastic material and is arranged underneath the first layer, and the second layer has at ambient temperature a marked relaxation behavior and is free of any inclusion of air.

2. A panel according to claim 1, wherein the panel comprises a decor layer at the upper surface of the supporting board.

3. A panel according to claim 2, wherein the supporting board is provided at its side with coupling elements.

4. A panel according to claim 2, wherein the supporting board includes fibers that are shorter than the fibers of the mat.

5. A method for the production of a panel according to claim 2 comprising providing on one side of a supporting board at least one decor layer and on the other side a mat built from fibers and a layer of thermoplastic material underneath the mat, cutting the board into smaller boards, and providing the smaller boards with coupling elements on their sides.

6. A panel according to claim 2, wherein the panel further comprises a counter acting layer underneath the supporting board.

7. A panel according to claim 2, wherein the panel has a thickness of 3 to 15 mm.

8. A panel according to claim 2, wherein the supporting board is made of HDF or MDF or chip board.

9. A panel according to claim 1, wherein the bottom side of the first and second layers is provided with a paper layer.

10. A panel according to claim 9, wherein the paper layer is impregnated with a synthetic resin.

11. A panel according to claim 1, wherein the mat is made from wood fibers and glue.

12. A panel according to claim 1, wherein the fibers include fibers with a length of up to 15 mm that are at least partially entangled with one another.

13. A panel according to claim 1, wherein the mat has a thickness of 1-4 mm, and the second layer of thermoplastic material has a thickness of 0.1-1 mm.

14. A panel according to claim 1, wherein the first and second layers are free of any inclusion of air.

15. A panel according to claim 1, further comprising a paper layer between the supporting board and the mat.

16. A panel according to claim 1, wherein the mat includes a rough surface attached to the supporting board and a smooth surface connected with the thermoplastic layer.

* * * * *